124,731

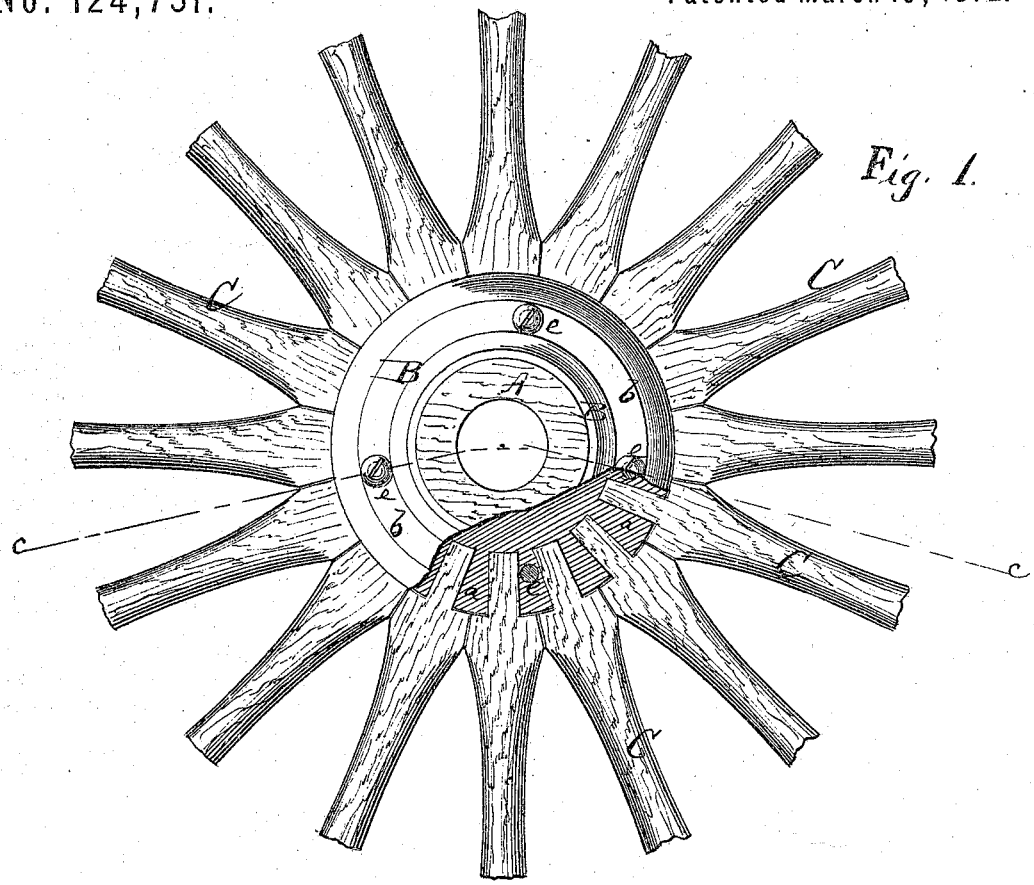
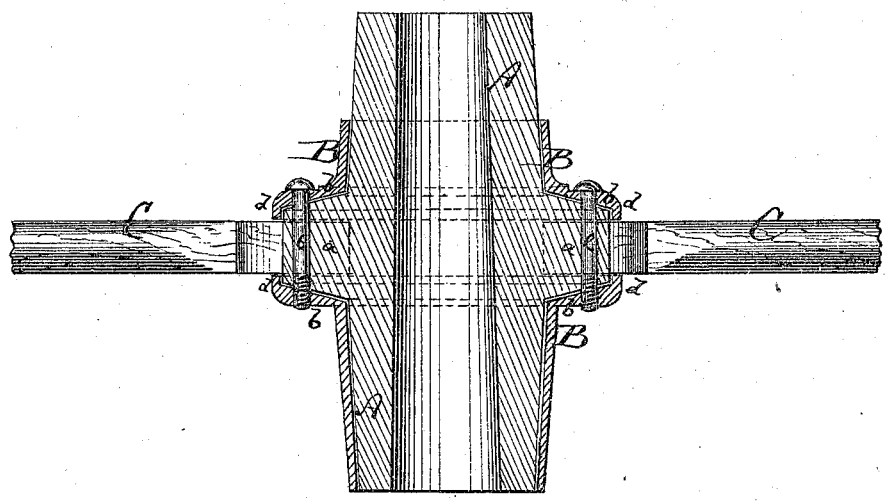

UNITED STATES PATENT OFFICE.

JOINVILLE F. FOWLER, OF ALLIANCE, OHIO.

IMPROVEMENT IN HUBS FOR CARRIAGE-WHEELS.

Specification forming part of Letters Patent No. 124,731, dated March 19, 1872.

Specification describing a new and Improved Hub for Wheels, invented by JOINVILLE F. FOWLER, of Alliance, in the county of Stark and State of Ohio.

Figure 1 represents a face view, partly in section, of my improved hub. Fig. 2 is a transverse section of the same on the line C C, Fig. 1.

Similar letters of reference indicate corresponding parts.

My invention has for its object to improve the construction of wheels whose hubs are made of a wooden core encircled by metal bands.

In the accompanying drawing, A represents the hub, made of wood of suitable size and form, and provided with projecting ribs $a$, in which mortises for receiving the spokes C C are arranged. The spokes are properly tenoned to fit the mortises, as is clearly indicated in Fig. 1. B B are two metal rings fitted over the ends of the hub, and provided, respectively, with flanges $b\ b$, which bear against the sides of the rib $a$, as in Fig. 2. Each flange has even a lip, $d$, with which it overlaps the edge of the rib. By means of screws or bolts $e\ e$ the flanges are secured to the rib, and the rings thereby held in place. By means of these flanged plates it will be seen that the use of metal between the spokes is dispensed with, the spokes being allowed to come close together, as shown.

Having thus described my invention, I claim as new and desire to secure by Letters Patent—

The flanged metal rings B B, having lips $d\ d$, secured to the wooden hub A by means of bolts passing through the ribs $a$ of the same, substantially as specified.

JOINVILLE F. FOWLER.

Witnesses:
SIMON JOHNSON,
D. FARDING.